United States Patent
Venturi

(10) Patent No.: US 7,685,394 B2
(45) Date of Patent: Mar. 23, 2010

(54) METHOD AND APPARATUS FOR CONFIGURING A STORAGE DEVICE

(75) Inventor: Ronald Venturi, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 11/233,706

(22) Filed: Sep. 23, 2005

(65) Prior Publication Data
US 2006/0117161 A1 Jun. 1, 2006

(30) Foreign Application Priority Data
Nov. 30, 2004 (GB) .................... 0426241.6

(51) Int. Cl.
*G06F 13/00* (2006.01)
(52) U.S. Cl. .............. 711/170; 711/202; 711/203; 711/E12.002
(58) Field of Classification Search .............. None
See application file for complete search history.

(56) References Cited

U.S. PATENT DOCUMENTS

| 5,313,585 | A | * | 5/1994 | Jeffries et al. ............ 711/201 |
| 5,735,743 | A | * | 4/1998 | Murata et al. ............ 463/35 |
| 6,026,463 | A | * | 2/2000 | Klein ...................... 711/4 |
| 7,039,788 | B1 | * | 5/2006 | Chang et al. ............ 711/203 |
| 2005/0223186 | A1 | * | 10/2005 | Belevich et al. ............ 711/202 |

OTHER PUBLICATIONS

The SCO Group. Managing disk resource usage. [online] Apr. 22, 2004, [retrieved on Jun. 10, 2008]. Retrieved from the Internet: <URL: http://uw714doc.sco.com/en/SM_perform/_Managing_Disk_Resource_Usage.html>.*

* cited by examiner

*Primary Examiner*—Reginald G Bragdon
*Assistant Examiner*—Larry T Mackall
(74) *Attorney, Agent, or Firm*—Lieberman & Brandsdorfer, LLC

(57) ABSTRACT

A method and apparatus is disclosed in which a storage device controller is arranged to use a set of sequential physical block addresses on a storage device as a single logical block address.

20 Claims, 4 Drawing Sheets

METHOD AND APPARATUS FOR CONFIGURING A STORAGE DEVICE

FIELD OF INVENTION

The present invention relates to a method and apparatus for configuring a storage device. More particularly, but not exclusively, the present invention relates to a storage device controller, which provides greater versatility in standardized devices.

BACKGROUND OF THE INVENTION

Storage systems for computers commonly comprise a storage device controller and an associated storage device such as a disk drive. The controller controls the transfer of data between a computer and the storage device via a component interface. One type of component interface is referred to as an IDE (Intelligent Drive Electronics or Integrated Drive Electronics). IDE is used as an interface standard for mass storage devices in which the controller is integrated into the disk or CD-ROM drive. IDE devices are also referred to as ATA (Advanced Technology Attachment) devices. ATA devices can be either serial or parallel devices.

In disk drives, data is input in logical blocks and stored in physical blocks on the physical sectors of the disk. The standard physical block size is 512 bytes. Some devices allow the size of the physical blocks to be altered by reformatting the storage device, thus allowing the standard block size of 512 bytes to be modified. However, it has become common practice for many devices to fix the block size to 512 bytes with no provision for reformatting. An example of this system exists in both serial and parallel IDE/ATA devices. Devices which allow the block size to be changed tend to be more expensive than those providing a fixed block size.

One way in which cheaper fixed block size devices can be used for larger logical block sizes is by mapping the larger logical block over two or more of the fixed physical blocks. Therefore one logical block may be written over a number of physical blocks so that any given physical block may contain parts of two different logical blocks. This process requires management of a mapping table which relates each logical block to the physical blocks in which the data is actually stored. Reading, writing, or rewriting data therefore involves significant processing overheads and thus affects the performance of the storage device and any connected computer. Writing or rewriting data is a particular problem as any given physical block may contain data from other logical blocks as well as the data for logical block being written or rewritten. Thus, writing or rewriting of one logical block requires saving data from other logical blocks in an alternative location before the writing or rewriting process can begin. The processing overhead for writing and rewriting are much greater than for basic read processes.

Therefore there is a need to provide a fixed physical block size storage device which can handle larger logical blocks with reduced processing overhead.

SUMMARY OF THE INVENTION

In one aspect of the invention, a method is provided for initializing a storage device controller. The method includes determining a block size of data for storage via the controller. A comparison of the data block size with a fixed storage block of the controller is conducted. Thereafter, the controller is configured to automatically store each data block separately in two storage blocks if the block size is greater than a size of the fixed storage block.

In another aspect of the invention, a computer storage device is provided. Data input is communicated for storage in a storage medium through a controller. The storage medium has physical storage blocks of a predetermined size. The controller manages storage of the data by arranging to store each block of input data separately in at least two physical storage blocks in the storage medium if a block size of the data input is greater than a size of a fixed storage block.

In yet another aspect of the invention, an article is provided having a computer readable medium. Means in the medium are provided for supporting initialization of a device controller having a fixed storage block size. The means in the medium include instructions for determining a block size of data for storage via the controller. In response to the determination, instructions are provided for comparing the block size with a fixed storage block size of the controller. Thereafter, instructions are provided for configuring the controller to automatically store each data block separately in two storage blocks if a size of the data block is greater than a size of the fixed storage block.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
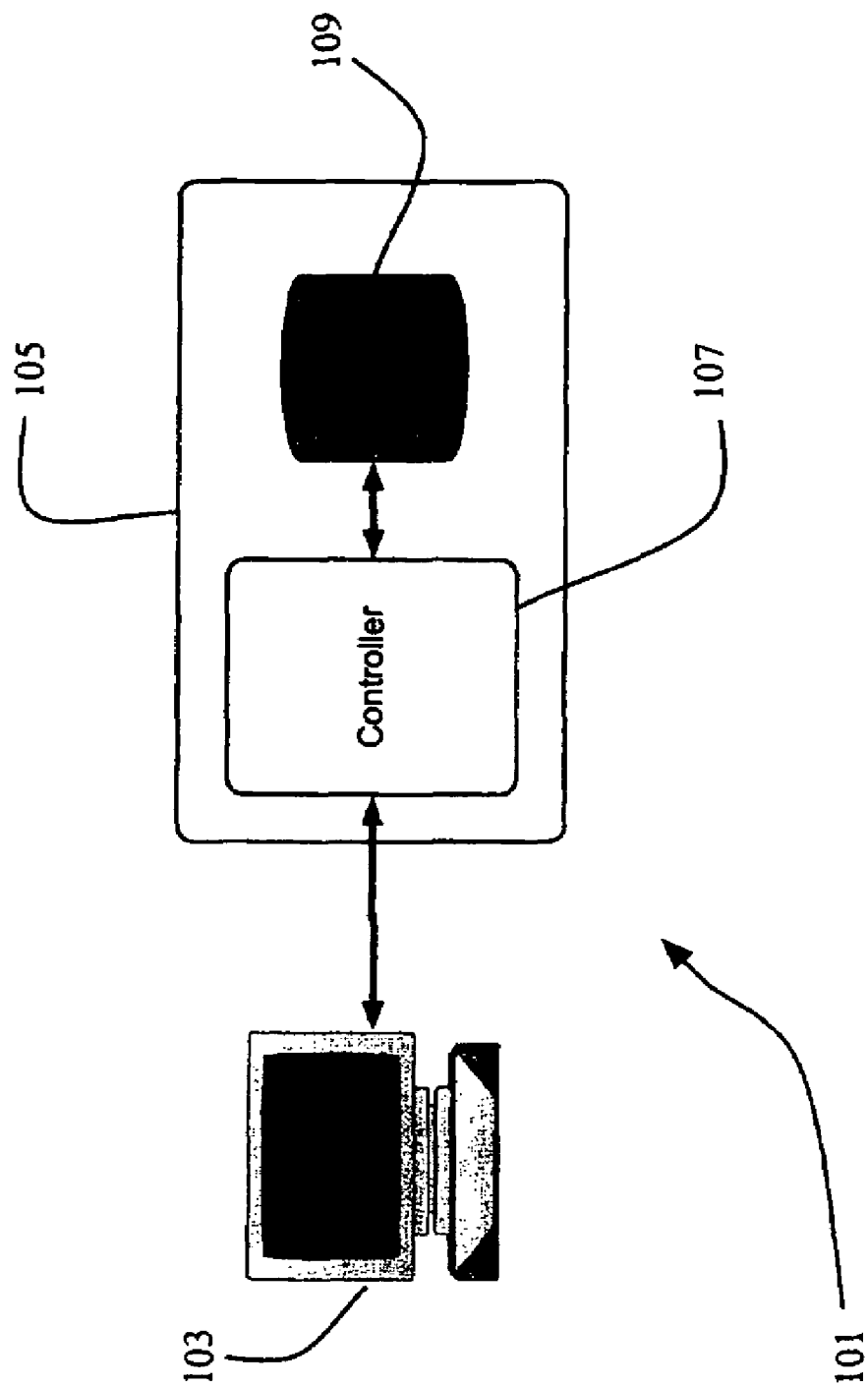
FIG. 1 is a schematic illustration of a computer and an attached storage system.

FIG. 1 is a block diagram of a computer system 101 having a computer 103 in the form of a PC connected to a storage system 105. The storage system 105 comprises a controller 107 and a storage device in the form of a disk drive 109. The controller 107 controls the transfer of data between the computer 103 and the peripheral storage device 105. The controller also governs the storage and retrieval of data on the disk drive 109. The controller communicates with the computer's expansion bus (not shown) using the ATA (Advanced Technology Attachment) protocol.

The disk drive 109 has a total capacity of 300 GB but has been set during manufacture to have a designated capacity of 150 GB. It is common in the manufacture of such disk drives to produce all drives to the same maximum capacity and subsequently to change the settings of the associated controller to clip or designate the drive to a lower capacity. This process effectively makes the unwanted capacity inaccessible. This approach can be more economic then producing different disk drives with different maximum capacities and is common with IDE/ATA devices.

The PC is running the Windows™ operating system which has an underlying basic operating system for handling communications with peripheral devices such as the storage device 105. When the basic operating system writes data to a logical address on the storage device, the data is communicated to the controller 107 in standard 512 byte blocks. The controller then converts the logical address of each standard block to a physical address of a block on the disk drive. Each standard 512 byte block of data from the computer is written to a 512 block of physical space on the disk drive. In other words there is a 1:1 ratio between the logical block address (LBA) and the physical block address (PBA).

Figure 2A:
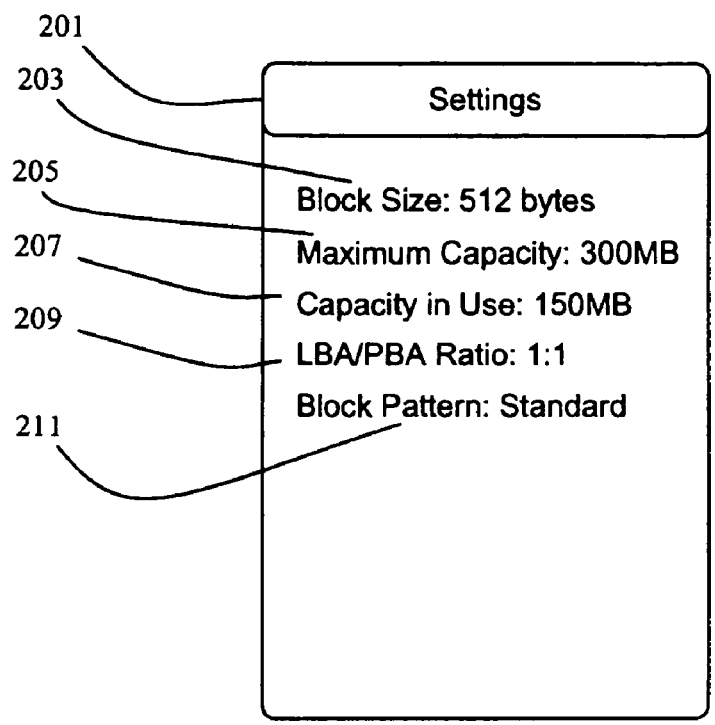
FIGS. 2a and 2b are tables illustrating configuration data for the storage system of FIG. 1.

The PC 103 includes a utility program which enables the configuration of the controller 107. FIG. 2a shows the controller settings 201 as viewed via the utility program. The settings 201 include the logical block size 203, the maximum capacity of the drive 205, the amount of the maximum capacity 207 that is currently in use, the LBA/PBA ratio 209 and the block pattern 211. In FIG. 2a, the settings show that the drive was manufactured as a 300 GB drive but clipped to a designated drive capacity of 150 GB. The logical block size is the standard 512 bytes for IDE/ATA devices and thus the LBA/PBA address ratio is 1:1. The significance of the block pattern 211 will be described further below.

Figure 2B:
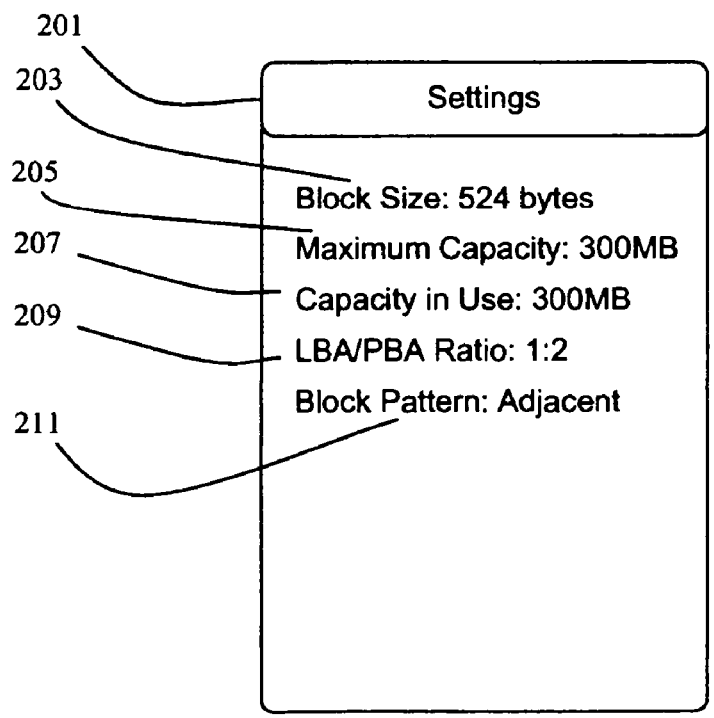

Some application programs require larger block sizes than the standard 512 byte block. In this case, the larger block size, for example 524 bytes is specified in the settings 201 for the controller as shown in FIG. 2b. In order to provide the larger logical block size, the controller is arranged to retrieve the extra physical storage capacity required from the clipped capacity of the drive. The controller then maps each LBA separately onto two or more PBAs. In the present example, the required 524 byte LBA can be provided by two of the standard 512 byte PBAs resulting in the LBA/PBA ratio changing to 1:2. Also, since each LBA now requires twice the physical storage, the amount of the disk drive capacity that is used rises to 300 GB as shown in FIG. 2b.

As noted above, in order to provide the larger LBA the controller carries out a 1:2 mapping. Thus as a logical block is written to the disk, the first 512 bytes are written to a main block and the remaining 12 bytes of overflow are written to an adjacent block. The remaining 500 bytes of the overflow block remain empty. In some situations it may be desirable to space the main block and the overflow block. In this case, the utility can be used to modify the block pattern 211 to specify alternative block patterns. For example, each main and overflow block pair can be spaced apart by one or more blocks and the intervening blocks used to interleave other main/overflow block pairs. In the example of FIG. 2b, the main and overflow blocks are adjacent.

When the controller writes or reads a logical block, the processing simply involves reading two adjacent blocks. The overflow block is not used to store any other data and so processing complications which would otherwise arise from this are not present. In other words, what space is not filled by the overflow data is left empty and thus rewriting a block only involves rewriting the two relevant blocks and not the moving of any other data.

Figure 3A:
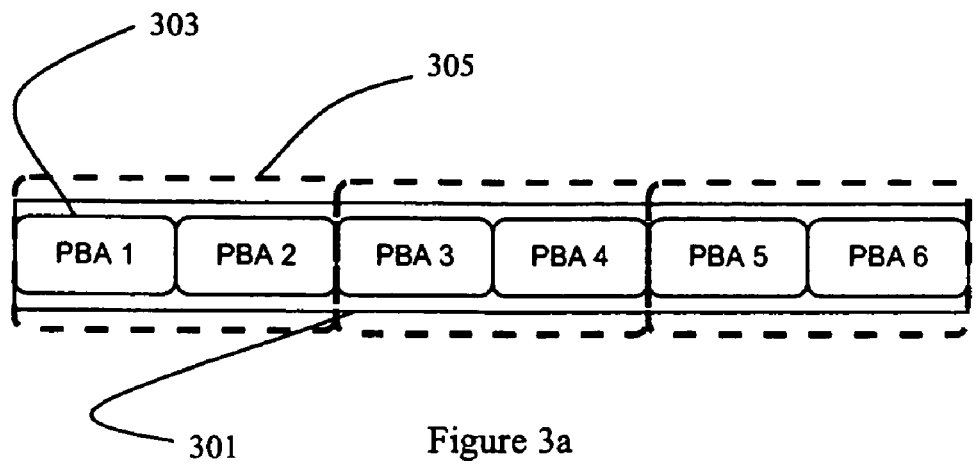
FIGS. 3a, 3b and 3c are illustrations showing the relation between logical block addresses and physical block storage for different configurations of the storage system of FIG. 1.

FIG. 3a shows a region of a track 301 on the disk drive and illustrates the relationship between the PBAs 303 and the LBAs 305 (the PBAs marked as PBA 1 to PBA 6 in FIG. 3a). In this case the block size 203 may have been set at a value more than 512 bytes and up to 1024 bytes thus requiring the utility program to set the LBA/PBA ratio to 1:2. Also, in this example the main and overflow physical blocks are adjacent on the track 301 as the block pattern 211 is set to adjacent.

Figure 3B:
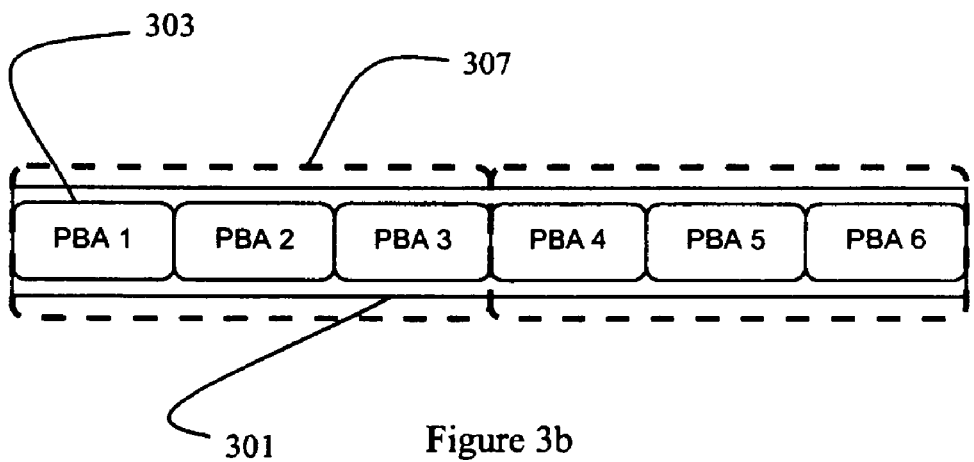
Figure 3C:
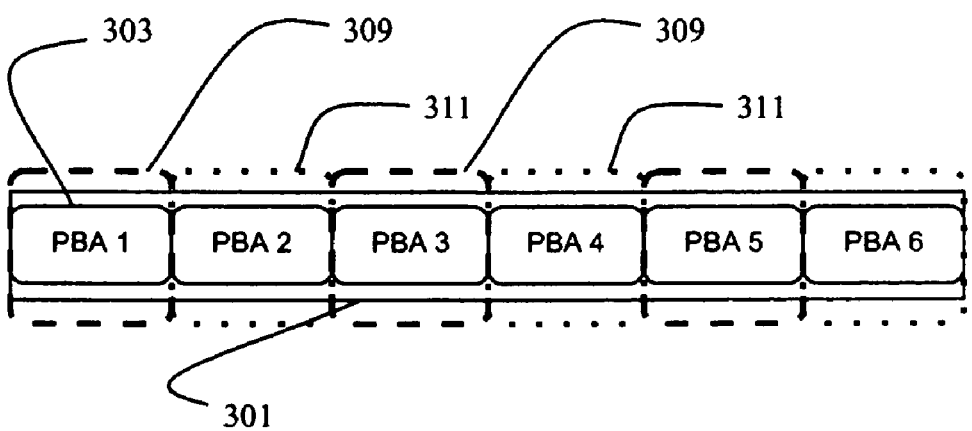

If the block size 203 is set to a value more than 1024 bytes and up to 1536 bytes then the LBA/PBA ration would be set to 1:3 and the relative distribution of LBAs and PBAs would appear as in FIG. 3b where the LBAs 307 cover three PBAs. If, the block size is kept at 524 bytes as in the example above but the block pattern 211 is changed to another setting such as "alternate" then the sequences of main and overflow blocks 309, 311 are interleaved as shown in FIG. 3c. In other words, each main/overflow block pair 309 is separated by one block from another such pair 311. In some situations this may provide more efficient reading or writing to the disk drive 109.

Figure 4:
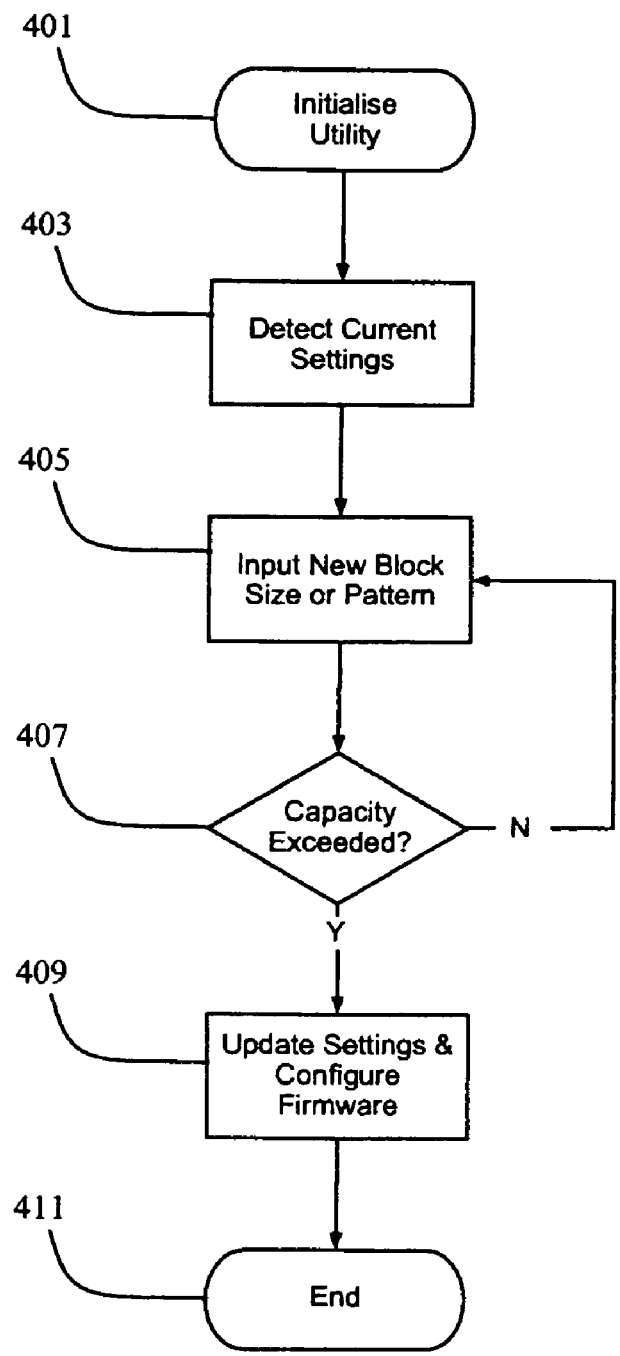
FIG. 4 shows a code routine used in the configuration of the storage system of FIG. 1.

The processing carried out by the utility program on the PC 103 to modify the settings 201 of the controller 105 will now be described with reference to the flow chart of FIG. 4. At step 401 the utility is initialized indicating that the user intends to view or modify the controller settings 201. At step 403, the utility interrogates the controller 105 to retrieve the current settings, for example, as set out in FIG. 2a. Processing then moves to step 405 where the user is able to alter the block size 203 or the block pattern 211 and processing moves to step 407. At step 407, the LBA/PBA ratio is calculated based on the new block size and a check carried out to establish if the drive has sufficient spare capacity to provide the new block size. If not then an error message is displayed to the user and processing returns to step 405 to enable the user to select a smaller block size or the user can accept the maximum block size automatically calculated and presented by the utility program.

If at step 407, the test is passed then processing moves to step 409 at which the new settings are saved in the controller. If the LBA/PBA ratio or the block pattern have changed then a mapping module in the controller firmware is updated to carry out the appropriate conversions between LBAs and PBAs with minimal processing overhead so as to implement the required block size. The configuration of the controller is then complete and processing ends at step 411.

In the above embodiment, if the block size is smaller than the PBAs to which an LBA has been mapped, then the spare capacity that remains in the final PBA is left unused. In an alternative embodiment, this spare capacity can be used to store further data relating to the data block such as data integrity measures in the form of checksums or other mechanisms. In the main embodiment above, if in step 407 the user chooses a block size which cannot be supported by the storage device then the user is given the option of specifying a smaller block size or accepting the automatically calculated maximum block size. In another embodiment the user is provided with the option of maintaining their chosen block size but with fewer blocks being available on the device.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via various transmission or storage means such as computer network, floppy disc, CD-ROM or magnetic tape so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

I claim:

1. A method for initializing a storage device controller, comprising:

determining a logical block size of data for storage via said controller, wherein said block size is set by a user;

comparing said logical block size with a fixed storage block size via said controller, absent the logical block size being a multiple of the storage block size;

adjusting the number of storage blocks corresponding to one logical block;

said controller, adjusting storage capacity to said logical block size by retrieving additional storage capacity from a clipped drive capacity;

configuring said controller to automatically store each logical data block separately in at least two physical storage blocks if said block size of data is greater than a size of said fixed storage block, wherein any physical storage block contains data associated with only one logical block, and wherein any remaining unused space in said at least two physical storage blocks remains unused.

2. The method of claim 1, wherein said controller is adapted for use with a storage device having spare storage capacity and designated storage capacity.

3. The method of claim 2, wherein the step of configuring said controller includes maintaining said designated storage capacity of said storage device while providing for storage of each data block over two storage blocks.

4. The method of claim 2, wherein the step of configuring said controller to automatically store each data block separately in two storage blocks is limited to spare storage capacity being sufficient to provide extra storage required to store each data block over two storage blocks without reducing designated device capacity.

5. The method of claim 1, wherein said controller includes a device selected from a group consisting of: an IDE, and an ATA.

6. The method of claim 1, further comprising updating a mapping module in controller firmware for conversion between logical blocks and physical blocks in response to a change selected from the group consisting of: a logical block size, block pattern, or a combination thereof.

7. A computer storage device comprising:

data input adapted to communicate input data to a storage medium via a controller;

said storage medium comprising physical storage blocks of a predetermined size to store said input data;

a logical block size of data set by a user, absent the logical block size being a multiple of the storage block size; and a controller adapted to manage storage of data on the storage medium including adjustment of storage capacity to said logical block size and adjustment of the number of storage blocks corresponding to one logical block, wherein the controller is arranged to store each logical block of input data separately in at least two physical storage blocks in the storage medium when a size of said input data is greater than a size of a fixed storage block, wherein any remaining unused space in said at least two physical storage blocks remains never used.

8. The device of claim 7, wherein said controller is adapted for use with a storage device having spare storage capacity and designated storage capacity.

9. The device of claim 8, wherein said controller is adapted to maintain said designated storage capacity of said storage device and to provide for storage of each data block over two storage blocks.

10. The device of claim 8, wherein said controller is adapted to automatically store each data block separately in two storage blocks when said spare storage capacity is sufficient to provide extra storage required to store each data block over two storage blocks without reducing designated device capacity.

11. The device of claim 7, wherein said controller includes a device selected from a group consisting of: an IDE, and an ATA.

12. The device of claim 7, further comprising a mapping module in controller firmware subject to an update to convert between logical blocks and physical blocks in response to a change selected from the group consisting of: a logical block size, block pattern, or a combination thereof.

13. The device of claim 7, wherein and any storage block contains data associated only with one logical block.

14. An article comprising:

a computer readable storage medium;

means in the medium for supporting initialization of a device controller having a fixed storage block size, wherein said means includes:

instructions in the medium to determine a logical block size of data for storage via said controller, wherein said block size is set by a user, absent the logical block size being a multiple of the storage block size;

instructions in the medium to compare said block size with a fixed storage block size of said controller, said controller to adjust storage capacity to said logical block size;

instructions in the medium to adjust the number of storage blocks corresponding to one logical block; and instructions in the medium for configuring said controller to automatically store each logical data block separately in at least two physical storage blocks if a size of said logical data block is greater than a size of said fixed storage block, wherein any remaining unused space in said at least two physical storage blocks remains never used.

15. The article of claim 14, wherein said controller is adapted for use with a storage device having spare storage capacity and designated storage capacity.

16. The article of claim 15, wherein the instructions for configuring said controller includes maintaining said designated storage capacity of said storage device while providing for storage of each data block over two storage blocks.

17. The article of claim 15, wherein the instructions for configuring said controller to automatically store each data block separately in two storage blocks is limited to said spare storage capacity being sufficient to provide extra storage required to store each data block over two storage blocks without reducing designated device capacity.

18. The article of claim 14, wherein said controller includes a device selected from a group consisting of: an IDE and an ATA.

19. The article of claim 14, further comprising instructions to update a mapping module in controller firmware for conversion between logical blocks and physical blocks in response to a change selected from the group consisting of: a logical block size, block pattern, or a combination thereof.

20. The article of claim 14, wherein and any storage block contains data associated only with one logical block.

* * * * *